United States Patent [19]

Morita et al.

[11] Patent Number: 4,685,075

[45] Date of Patent: Aug. 4, 1987

[54] APPARATUS FOR MEASURING PROPAGATION TIME OF ULTRASONIC WAVES

[75] Inventors: Yukiji Morita; Masafumi Yoshida, both of Tokyo, Japan

[73] Assignee: Kaijo Denki Co., Ltd., Japan

[21] Appl. No.: 606,540

[22] Filed: May 3, 1984

[51] Int. Cl.$^4$ .................. G01R 29/02; G04F 10/00
[52] U.S. Cl. .................. 364/569; 364/486; 364/571; 377/20
[58] Field of Search ............ 364/569, 571, 833, 486; 377/19, 20, 49; 328/129.1, 130.1

[56] References Cited

U.S. PATENT DOCUMENTS

| | | | |
|---|---|---|---|
| 4,165,459 | 8/1979 | Curtice | 235/92 TF |
| 4,303,983 | 12/1979 | Chaborski | 364/569 |
| 4,434,470 | 2/1984 | Thomas et al. | 364/565 |
| 4,468,746 | 8/1984 | Davis | 364/569 |
| 4,485,452 | 11/1984 | Cording et al. | 364/565 |
| 4,523,288 | 6/1985 | Hayashi | 364/569 |

Primary Examiner—Errol A. Krass
Assistant Examiner—Daniel W. Juffernbruch
Attorney, Agent, or Firm—Steinberg & Raskin

[57] ABSTRACT

In apparatus for measuring the propagation time of ultrasonic waves by counting the number of clock pulses occurring within the period of time from the transmission of an ultrasonic pulse to the receiving of the pulse, a receiving circuit receives a transmitted pulse and a received pulse and provides an output which continues from transmission until reception of the pulse. A time-difference detection circuit detects pulses occurring during a time interval $t_1$ starting at the leading edge of the transmission pulse and ending at the leading edge of the first clock pulse thereafter and a time interval $t_2$ starting at the leading edge of the received pulse and ending at the leading edge of the first clock pulse thereafter. The duration of the time interval t between transmission and reception is determined in accordance with the equation $$t = [A + 1/m(B-C)] \times \text{(time corresponding to one clock wavelength)}$$

where B is a digital numeric value corresponding to the time interval $mt_1$; C is a digital numeric value corresponding to the time interval $mt_2$ and m is the amplification ratio.

5 Claims, 11 Drawing Figures

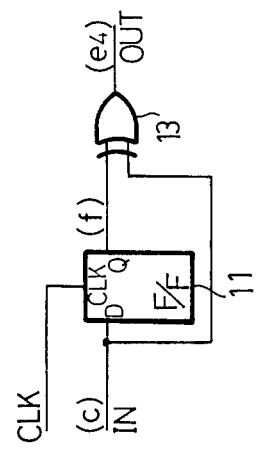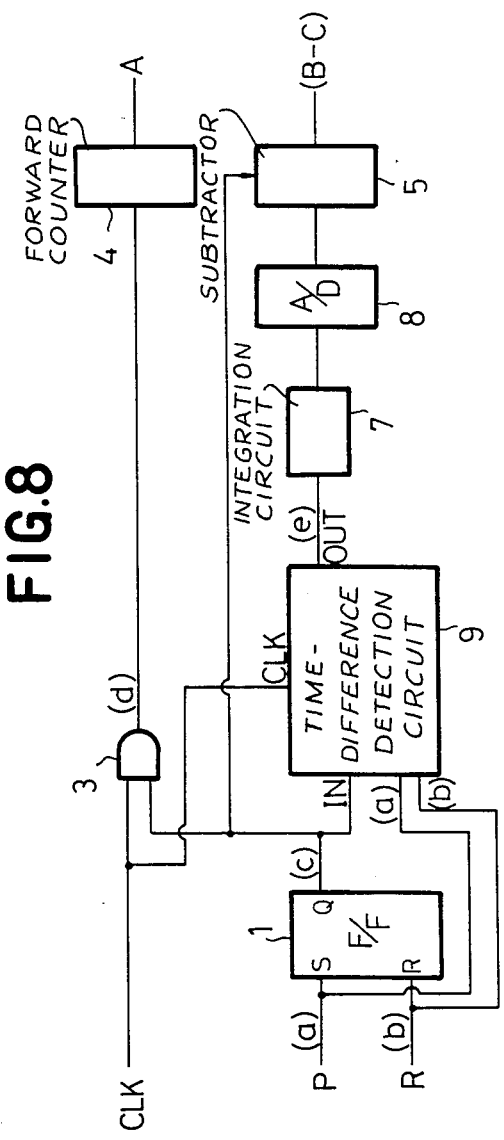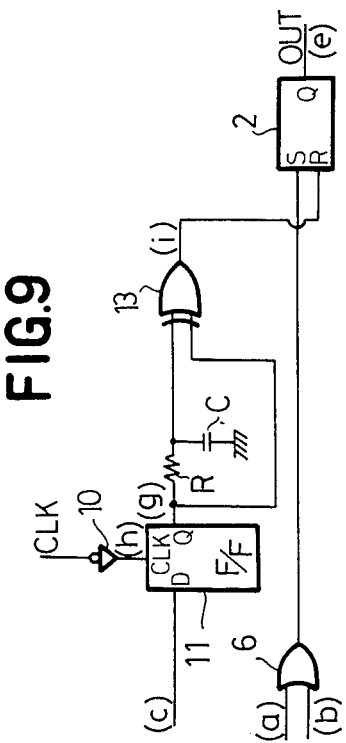

4,685,075

APPARATUS FOR MEASURING PROPAGATION TIME OF ULTRASONIC WAVES

BACKGROUND OF THE INVENTION

The present invention relates to apparatus for measuring the propagation time of ultrasonic waves. More particularly, the invention relates to apparatus including a wave transmitter and a wave receiver arranged in separated and opposed relationship with each other, which apparatus measures the time interval from the transmission of an ultrasonic pulse by the transmitter until the receiving of such pulse by the receiver and calculates wind velocity or flow velocity on the basis of the result of the measurement.

In apparatus of the aforedescribed type, the time interval from the transmission until the reception of a pulse is measured by counting the number of clock pulses within said interval. In conventional apparatus, however, only an integral number of clock pulses are counted, and any time of less than one pulse is neglected and omitted. However, in apparatus of this type, the time interval between the transmission of a pulse and its reception is extremely short, so that any time of less than one clock pulse produces an error which can not be neglected in practice. Since there is no appropriate solution of this problem, however, the error inevitably appears in the measured result.

One method of improving the measurement accuracy would be to increase the frequency of the clock pulses. However, this method would result in a complicated structure of each of the transmitter, receiver, counter, etc., and the inspection and maintenance of these devices would be time-consuming and troublesome.

SUMMARY OF THE INVENTION

The principal object of the invention is to provide apparatus for measuring the propagation time of ultrasonic waves, which apparatus eliminates the error problem of the apparatus of the prior art.

An object of the invention is to provide apparatus for measuring the propagation time of ultrasonic waves by accurately measuring a time interval of less than one clock pulse without the necessity for increasing the frequency of the clock pulses.

Another object of the invention is to provide apparatus for measuring the propagation time of ultrasonic waves, which apparatus measures any time interval with considerably improved accuracy.

In accordance with the invention, apparatus for measuring the propagation time of ultrasonic waves by counting the number of clock pulses occurring within the period of time from the transmission of an ultrasonic pulse until the receiving of such pulse comprises a receiving circuit which receives a transmitted pulse and a received pulse and provides an output which continues from transmission until reception. A gate circuit receives the output of the receiving circuit and also receives clock pulses. A time-difference detection circuit detects pulses which occur during a time interval $t_1$ starting at the leading edge of the transmission pulse and ending at the leading edge of the first clock pulse thereafter, and a time interval $t_2$ starting at the leading edge of the received pulse and ending at the leading edge of the first clock pulse thereafter. The time-difference detection circuit provides an output. An integration circuit receives the output of the time-difference detection circuit and provides an output. An analog-digital converter digitizes the output of the integration circuit at amplification ratios which are m times the time interval $t_1$ and the time interval $t_2$. The analog-digital converter provides an output. A subtractor receives the output of the analog-digital converter and the output of the receiving circuit, which continues from transmission to reception, and calculates the difference between a digital numeric value B corresponding to the time interval $mt_1$ detected from the output of the analog-digital converter and a digital numeric value C corresponding to the time interval $mt_2$.

The duration of the time interval t between transmission and reception is determined in accordance with the equation $$t=[A+1/m(B-C)]\times(\text{time corresponding to one clock wavelength}).$$

In accordance with another embodiment of the invention, apparatus for measuring the propagation time of ultrasonic waves by counting the number of clock pulses occurring within the period of time from the transmission of an ultrasonic pulse until the receiving of such pulse comprises a receiving circuit which receives a transmitted pulse and a received pulse and generates an output which continues from transmission until reception of such pulse. A gate circuit receives the output of the receiving circuit and also receives clock pulses. The gate circuit provides an output. A forward counter receives the output of the gate circuit and counts a number A of clock pulses in the output of the gate circuit. A time-difference detection circuit detects pulses which occur during a time interval $t_1+t_0$ and a time interval $t_2+t_0$, where $t_1$ is a time interval starting at the leading edge of the transmission pulse and ending at the leading edge of the first clock pulse thereafter, $t_2$ is a time interval starting at the leading edge of the received pulse and ending at the leading edge of the first clock pulse there-after, and $t_0$ is an arbitrary predetermined delay time. The time-difference detection circuit provides an output. An integration circuit receives an output from the time-difference detection circuit and provides an output. An analog-digital converter digitizes the output of the integration circuit at amplification ratios which are m times the time interval $t_1+t_0$ and the time interterval $t_2 t_0$. The analog-digital converter provides an output. A subtractor receives the output from the analog-digital converter and the output from the receiving circuit which continues from transmission until reception, and calculates the difference between a digital numeric value B corresponding to the time interval $m(t_1+t_0)$ detected from the output of the analog-digital converter and a digital numeric value C corresponding to the time interval $m(t_2+t_0)$.

The duration of the time interval t between transmission and reception is determined in accordance with the equation $$t=[A+1/m(B-C)]\times(\text{time corresponding to one clock wavelength}).$$

BRIEF DESCRIPTION OF THE DRAWINGS

For a fuller understanding of the invention, reference is had to the following description, taken in connection with the accompanying drawings, in which:

FIG. 8 is a block diagram of still another embodiment of the apparatus of the invention for measuring propagation time of ultrasonic waves;

FIGS. 9 and 10 are block diagrams of different embodiments of the time-difference detection circuit of the apparatus of FIG. 8.

DESCRIPTION OF PREFERRED EMBODIMENTS

Figure 2:
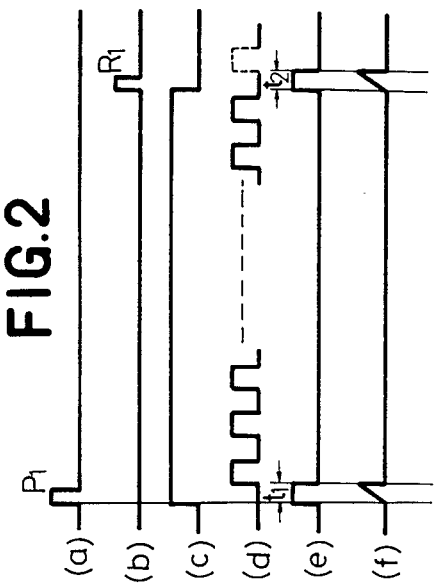
FIG. 2 is a waveform diagram illustrating the operation of the apparatus of the embodiment of FIG. 1.

In the FIGS., the same components are identified by the same reference numerals. Reference numerals 1, 2, 11, 12 and 14 represent a flip-flop circuit. Reference numeral 3 represents an AND gate. Reference numeral 4 represents a forward counter. Reference numeral 5 represents a subtractor. Reference numeral 6 represents an OR gate. Reference numeral 7 represents an integration circuit. Reference numeral 8 represents an analog-digital converter. Reference numeral 9 represents a time-difference detection circuit. Reference numeral 10 represents an inverter. Reference numeral 13 represents an exclusive OR gate. Reference numeral 15 represents a buffer.

Figure 1:
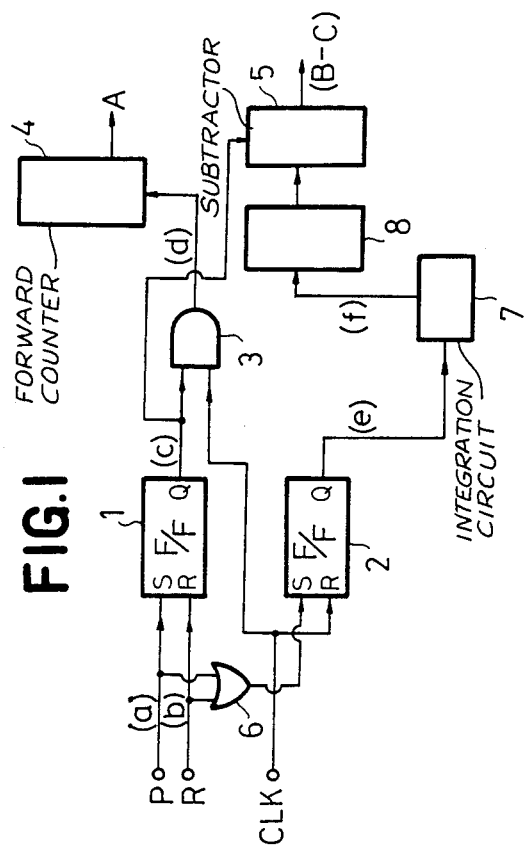
FIG. 1 is a block diagram of an embodiment of the apparatus of the invention for measuring propagation time of ultrasonic waves.

The apparatus of the embodiment of FIG. 1 comprises set-reset flip-flop circuits 1 and 2, an AND gate 3, a forward counter 4, a subtractor 5, an OR gate 6, an integrator 7, an analog-digital converter 8.

The apparatus of FIG. 1 has an input terminal P for a transmission pulse, an input terminal R for a received or reception pulse and an input terminal CLK for clock pulses.

When a transmission pulse $P_1$ (FIG. 2a) received at the input terminal P and a reception or received pulse $R_1$ (FIG. 2b) received at the input terminal R are input, respectively, to the set terminal S and the reset terminal R of the first flip-flop circuit 1, there is an output of said flip-flop circuit between said transmission pulse and said reception pulse, as illustrated in FIG. 2c. The output of the flip-flop 1 is input to one of the terminals of the AND gate 3.

The clock pulses from the terminal CLK are input to the other terminal of the AND gate 3, and an output from said AND gate, having a waveform such as that shown in FIG. 2d, is input to the forward counter 4, which counts the number A of incoming clock pulses.

The second flip-flop circuit 2 and the OR gate 6 together function as a time-difference circuit which detects time differences $t_1$ and $t_2$. The transmission pulse $P_1$ and the received pulse $R_1$ are input to the set terminal S of the flip-flop circuit 2 via the OR gate 6. The flip-flop 2 provides an output, shown in FIG. 2e, for the time interval or period $t_1$ starting at the leading edge of the transmission pulse $P_1$ and ending at the leading edge of the first clock pulse after said transmission pulse.

Similarly, the flip-flop 2 provides an output for the time interval or period $t_2$ starting at the leading edge of the received pulse $R_1$ and ending at the leading edge of the first clock pulse after said received pulse. These outputs are applied as inputs to the integration circuit 7 where they are integrated to form triangular waves such as those shown in FIG. 2f. The analog value of the triangular waves is then converted to a digital value by the analog-digital converter 8 and the digital value is input to the subtractor 5.

If an appropriate degree of resolution is selected for the analog-digital converter 8, data may be processed at an amplification determined by the resolution, for example, m, that is, by multiplying $t_1$ and $t_2$ by m, when the outputs of the time interval $t_1$ and the time interval $t_2$ detected by the second flip-flop circuit 2 are integrated and digitized.

The output from the first flip-flop circuit 1 (FIG. 2c) is fed to the subtractor 5 and registers data B or subtracts data C. Accordingly, the difference B−C between the digital value B corresponding to the time interval $mt_1$ and the digital value C corresponding to the time interval $mt_2$ is obtained at the output of the subtractor 5.

A calculated value representing the accurate time interval between the transmission signal and the received signal may be obtained by calculating and processing the counts A and (B−C) thus obtained, in the following manner.

The scale of the analog-digital converter is set to m, so that full-scale is obtained at a time interval corresponding to one count obtained by A. The one-bit value obtained by (B−C) has a weighting corresponding to 1/m of the time interval. In order to convert these two values into the same time units, the count A must be multiplied by m, or the count (B−C) must be multiplied by 1/m. In other words, m times the numeric value of (B−C) has the same time units as A.

Accordingly, the time interval t between transmission and reception is given by the equation time interval $t = [A \times m + (B - C)] \times \dfrac{\text{(time corresponding to one clock wavelength)}}{m}$ or $t = [A + 1/m(B - C)] \times$ (time corresponding to one clock wavelength)

Known calculation methods may be used, such as digital calculation or conversion to analog values, but no specific calculation method is discussed herein.

Figure 3:
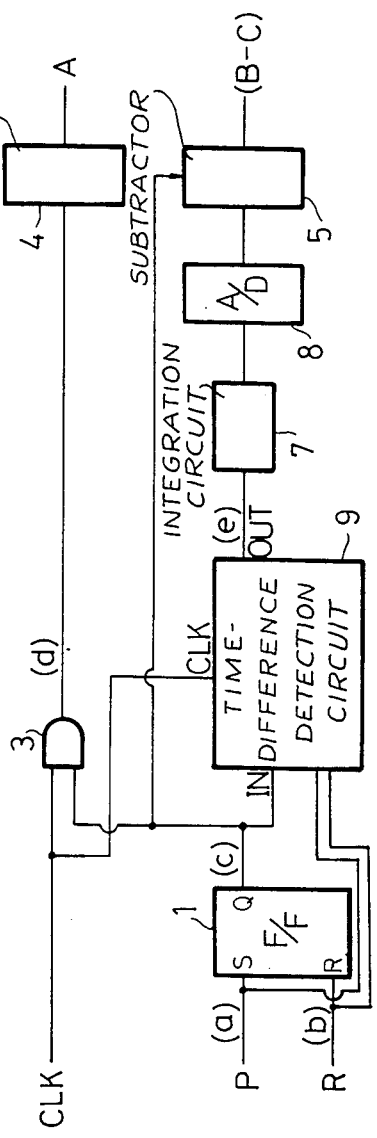
FIG. 3 is a block diagram of another embodiment of the apparatus of the invention for measuring propagation time of ultrasonic waves.

FIG. 3 illustrates another embodiment of the apparatus of the invention, which is an improved version of the embodiment of FIG. 1. In the embodiment of FIG. 1, the integrated waveform obtained by the integration of the output (e) of the flip-flop circuit 2 by the integrator 7 is a triangular waveform, as shown in FIG. 2f. However, since the waveform does not ascend immediately at the start of the leading edge, but does so gradually and a little belatedly, the shape of the inclined portion of the waveform is not completely linear. For this reason, the measured value $t_1$ of the duration of this inclined portion contains an error due to the fact that the inclined portion is not completely linear. Since the subtraction B−C is effected later by the subtractor 5, this error may be compensated by the error in the integrated waveform of the received pulse, but this compensation will not occur when either of the time intervals $t_1$ and $t_2$ is shorter than the duration of the non-linear portion of the leading edge. In such a case, the error will remain.

In order to compensate for the non-linear portion and improve the measurement accuracy, the embodiment of FIG. 3 adds a predetermined delay time $t_0$ to both time intervals $t_1$ and $t_2$, integrates the time interval $t_1+t_0$ and the time interval $t_2+t_0$, and thereafter effects the subtraction B−C.

In the embodiment of FIG. 1, wherein $t_0=0$, the flip-flop is set by the transmission or received pulse and is reset by a clock pulse to detect the time difference $t_1$ or $t_2$. In the embodiments of FIGS. 4 to 7, 9 and 10, the time interval data is converted into data which is synchronized with clock pulses, and any time which can not be detected by the synchronization is detected by an exclusive OR gate, or the like.

The embodiment of FIG. 3 includes a time-difference detection circuit 9 which detects pulses which continue during the time interval $t_1+t_0$ and the time interval $t_2+t_0$, where $t_1$ and $t_2$ are time intervals which start at the leading edges of the transmission and reception pulses and end at the leading edges of the first clock pulses after said transmission and reception pulses, respectively, and $t_0$ is an arbitrary predetermined delay time.

Figure 4:
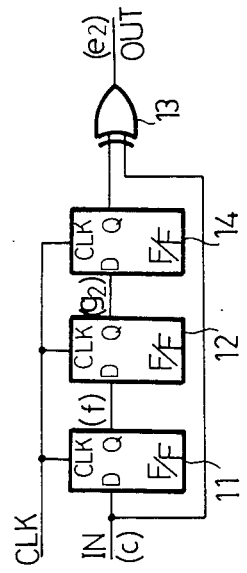
FIGS. 4 to 7 are block diagrams of different embodiments of the time-difference detection circuit of the apparatus of FIG. 1.

FIGS. 4 to 7 illustrate various embodiments of the time-difference detection circuit 9 of the apparatus of the invention. In FIG. 4, the time-difference detection circuit consists of an inverter 10, two D-type flip-flop circuits 11 and 12, and an exclusive OR gate 13. The circuit of FIG. 4 provides a delay time $t_0$ corresponding to half the wavelength of one pulse.

Figure 11:
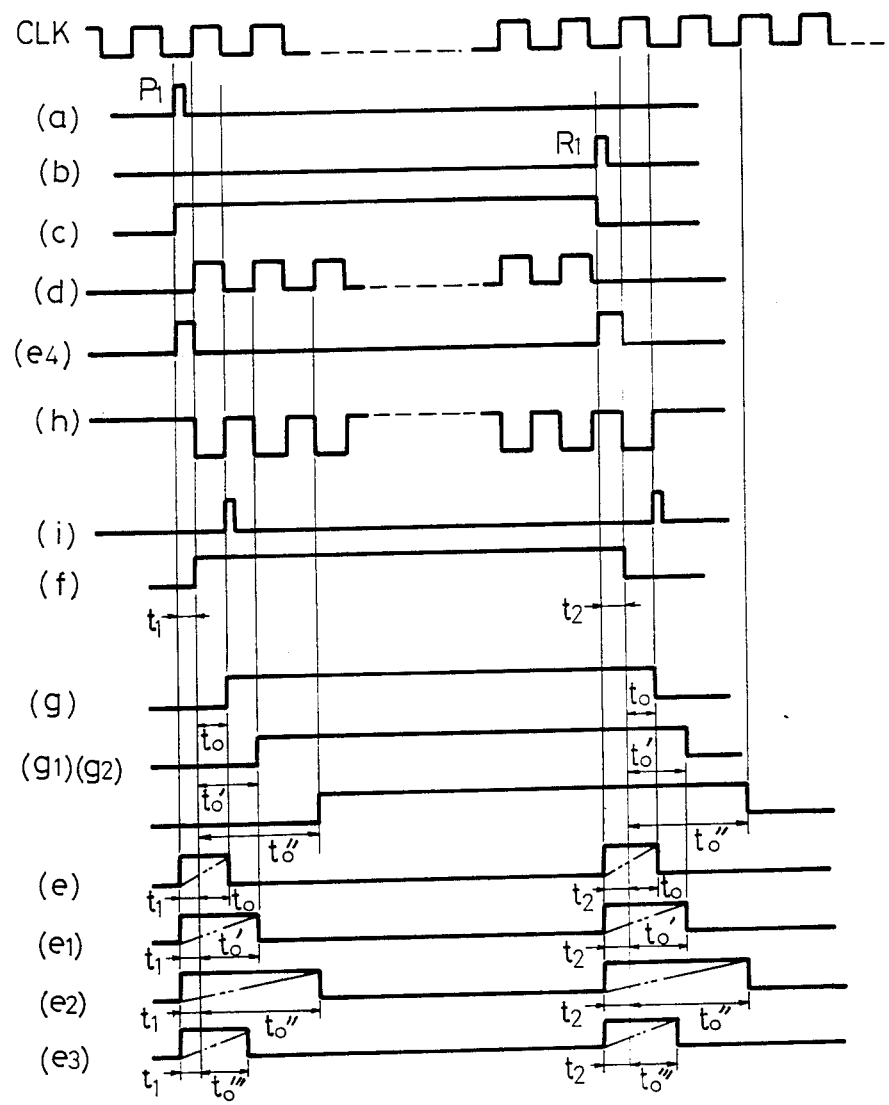
FIG. 11 is a waveform diagram illustrating the operation of the embodiments of FIGS. 3 to 7, 9 and 10.

The operation of the apparatus of the invention, utilizing the time-difference detection circuit 9 of FIG. 4 is described with reference to FIG. 11, as follows. When the transmission pulse $P_1$ from the input terminal P (FIG. 11a) and the received pulse $R_1$ from the input terminal R (FIG. 11b) are input to the set terminal S and the reset terminal R, respectively, of the flip-flop circuit 1, said flip-flop circuit provides an output between said transmission pulse and said received pulse, and this output is input to one of the terminals of the AND gate 3.

The clock pulses from the input terminal CLK are input to the other terminal of the AND gate 3 and said AND gate provides an output as shown in FIG. 11d. The output of the AND gate 3 is input to the forward counter 4 which counts the number A of incoming clock pulses.

The output (c) of the flip-flop circuit 1 is fed to the D-type flip-flop circuit 11 of the time-difference detection circuit 9. The clock pulses produce a waveform which rises after a delay of the time interval $t_1$ after the transmission pulse $P_1$ and falls after a delay of the time interval $t_2$ after the received pulse $R_1$, as shown in FIG. 11f. This signal is further input to the D-type flip-flop circuit 12, and is inverted by the inverter 10. As a result, a waveform delayed by the time $t_0$ after the waveform (f), as shown in FIG. 11g, is produced by the clock pulses, delayed by the time $t_0$ corresponding to half the wavelength. This output is applied together with the output (c) to the exclusive OR gate 13 which provides the waveform shown in FIG. 11e.

The waveform of FIG. 11e provides an output for the time interval $t_1+t_0$, which is the sum of the time interval $t_1$ at the leading edge of the transmission pulse $P_1$ to the leading edge of the first clock pulse after said transmission pulse and the delay time $t_0$, corresponding to half the wavelength, and an output for the time interval $t_2+t_0$ which is the sum of the time interval $t_2$ from the leading edge of the received pulse $R_1$ to the leading edge of the first clock pulse after said received pulse and the delay time $t_0$, corresponding to half the wavelength.

The output of the time-difference detection circuit 9 is input to the integration circuit 7, which produces an output of a triangular waveform represented by the dot-dot-dash line in FIG. 11e. The output of the triangular waveform of FIG. 11e is an analog value, is converted to a digital value by the analog-digital converter 8 and is thereafter input to the subtractor 5.

If the appropriate resolution of the analog-digital converter 8 is selected, it is possible to process the data at an amplification determined by the resolution, for example, m, that is, by multiplying the interval $t_1+t_0$ and the interval $t_2+t_0$ by m, when the output of the time interval $t_1+t_0$ and the output of the time interval $t_2+t_0$ detected by the time-difference detection circuit 9 are integrated and digitized.

The output from the flip-flop circuit 1 (FIG. 11c) is fed to the subtractor 5 and is changed over between a mode in which a minuend is set or a subtraction mode. When the flip-flop 1 produces an output, the minuend is stored and when the output is at zero level, subtraction is effected. Accordingly, the subtractor 5 provides the difference B−C between the digital value B corresponding to the minuend $m(t_1+t_0)$ and the digital value C corresponding to the minuend $m(t_2+t_0)$.

When the values A and (B−C) thus obtained are calculated in the following manner, a calculated value representing the correct time interval from the transmission signal to the reception or received signal may be obtained.

The scale of the analog-digital converter 8 is set to m, so that full-scale is obtained at a time interval corresponding to one count obtained by A. In this case, the one-bit value obtained by (B−C) has a weighting corresponding to $1/m$ of the time interval. In order to convert these two values into the same time units, it is necessary either to multiply the count A by m, or to multiply the count (B−C) by $1/m$. In other words, m times the numeric value of (B−C) has the same time units as those of A.

Accordingly, the time interval t between transmission and reception may be expressed by the equation $$\text{time interval } t = [A \times m + (B - C)] \times \frac{(\text{time corresponding to one clock wavelength})}{m}$$

or $$t=[A+1/m\,(B-C)]\times(\text{time corresponding to one clock wavelength})$$

Known calculation methods may be used, such as digital calculation or conversion to analog values, but no specific method of calculating this equation is discussed herein.

In the embodiment with the aforedescribed operation, even if there is a non-linear portion close to the starting point of the leading edge of the output from the integration circuit 7, represented by the dot-dot-dash line in FIG. 11e, such a non-linear portion is subtracted and compensated for by the subtractor 5. Accordingly, the time difference B−C corresponding to $$(t_1+t_0)-(t_2+t_0)=t_1-t_2$$

may be measured extremely accurately on the basis of the linear portion of the waveform.

If the non-linear portion at the rise of the triangular waveform is elongated, it may be compensated for by extending the delay time $t_0$.

Figure 6:
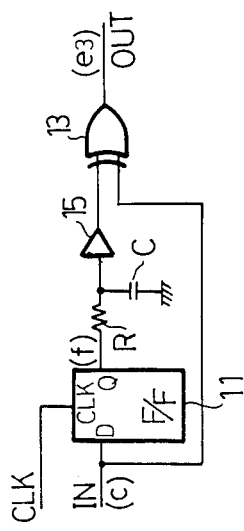
Figure 5:
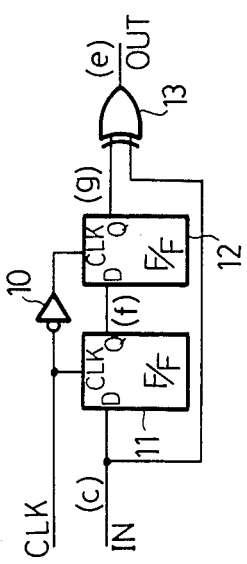

FIGS. 5 and 6 show time-difference detection circuits which utilize two and three D-type flip-flop circuits 11 and 12 and 11, 12 and 14, respectively. In these circuits, the corresponding delay times $t_0$ are set as follows:
$t_0'$ is the time interval or period corresponding to one wavelength and
$t_0''$ is the time interval or period corresponding to two wavelengths. The output waveforms are shown in FIGS. 11g1, 11e1, and 11g2, 11e2.

Figure 7:
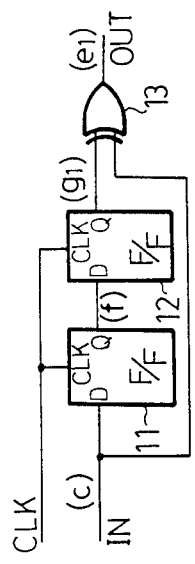

In the time-difference detection circuit 9 of FIG. 7, the output of one D-type flip-flop circuit 11 is delayed by a delay circuit consisting of a resistor R, a capacitor C and a buffer 15. An arbitrary delay time $t_0'''$ may be obtained by selecting suitable values for the capacitance of the capacitor C and the resistance of the resistor R. The output waveform is shown in FIG. 11e3.

In the embodiments of FIGS. 8 and 9, the delay time $t_0$ of the time-difference detection circuit 9 corresponds to half the wavelength. In the time-difference detection circuit 9, the transmission pulse $P_1$ from the input terminal P and the received pulse $R_1$ from the input terminal R are input together to the OR gate 6.

The time-difference detection circuit 9 of FIG. 9 operates as follows. The waveform of FIG. 11c is input to the D-type flip-flop circuit 11 and is inverted by the inverter 10. The clock pulse, delayed by the time $t_0$ corresponding to half the wavelength, is input in the waveform shown in FIG. 11h, and the waveform shown in FIG. 11g is generated. The output produces a waveform shown in FIG. 11i via a circuit which generates a pulse in synchronization with each of a positive edge and a negative edge of the waveform (g). The circuit for generating a pulse comprises a resistor R, a capacitor C and an exclusive OR gate 13, and the output is fed together with the output from the OR gate 6 to the flip-flop circuit 2. The flip-flop 2 produces an output waveform during the time interval $t_2+t_0$, as shown in FIG. 11e. This output is the same as the output (e) in FIG. 4, so that the operation thereafter is the same as that of FIG. 4.

The time-difference detection circuit 9 of FIG. 10 includes one D-type flip-flop circuit 11 and an exclusive OR gate 13 and the delay time $t_0$ is zero. The embodiment of FIG. 10 operates in the same manner as the embodiment of FIG. 1. The circuit produces a pulse during the time interval $t_1$ and the time interval $t_2$, as shown in FIG. 11e4.

In the apparatus of the prior art, only a count A is obtained and this count is used to indicate the time interval between transmission and reception. Accordingly, any portion thereof less than one wavelength of the clock pulse can not be counted, and error is inevitable. On the other hand, the apparatus of the present invention can measure portions of less than one wavelength of clock pulse by utilizing an interval-expanding circuit, and eliminates the necessity for increasing the frequency of clock pulses in order to improve the accuracy of measurement. The counter used need not be of a particularly high grade, and the present invention is extremely advantageous, not only from the aspect of its manufacture, but also from the economic point of view. Furthermore, the delay time $t_0$ is included in the time-difference detection circuit 9 in order to eliminate the errors resulting from the non-linear portions of the integration output. Thus, the apparatus of the invention for measuring the propagation time of ultrasonic waves can measure the propagation time more accurately than apparatus of the prior art and has extremely large effects.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Apparatus for measuring the propagation time of ultrasonic waves by counting the number of clock pulses occurring within the period of time from the transmission of an ultrasonic pulse to the receiving of said ultrasonic pulse, said apparatus comprising a receiving circuit for receiving a transmitted pulse and a received pulse and producing an output which continues from transmission until reception of said received pulse, said receiving circuit comprising a first flip-flop circuit having inputs receiving said transmitted pulse and said received pulse, respectively, and an output;

a gate circuit for providing an output and receiving the output of said receiving circuit, and for receiving clock pulses;

a forward counter for receiving the output of said gate circuit, said counter counting the number A of clock pulses in the output of said gate circuit;

a time-difference detection circuit for receiving the output of said receiving circuit and said clock pulses and for detecting pulses occurring during a time interval $t_1+t_0$ and a time interval $t_2+t_0$, where $t_1$ is a time interval starting at the leading edge of said transmitted pulse and ending at the leading edge of the first clock pulse thereafter, $t_2$ is a time interval starting at the leading edge of said received pulse and ending at the leading edge of the first clock pulse thereafter, and $t_0$ is an arbitrary predetermined delay time, said time-difference detection circuit providing an output, said time difference detection circuit comprising a second flip-flop circuit having a first input receiving the output of said first flip-flop circiut, a second input receiving said clock pulses and an output, and an exclusive OR gate having an output and inputs receiving the output of said second flip-flop circuit and the output of said first flip-flop circuit, respectively;

an integration circuit for receiving the output of said time-difference detection circuit, said integration circuit providing an output;

an analogue-digital converter for digitizing the output of said time-difference detection circuit, said integration circuit providing an output;

an analog-digital converter for digitizing the output of said integration circuit at amplification ratios which are m times said time interval $t_1+t_0$ and said time interval $t_2+t_0$, said analog-digital converter providing an output; and a subtractor for receiving the output of said analog-digital converter and the output of said receiving circuit which continues from transmission to reception, and calculating the difference between a digital numeric value B corresponding to the time interval $m(t_1+t_0)$ detected numeric value C corresponding to the time interval $m(t_2+t_0)$, the duration of the time interval t between transmission and reception being determined in accordance with the equation, $t=[A+1/m(B-C)]\times$ (time corresponding to one clock wavelength).

2. Apparatus according to claim 1, wherein said time-difference detection circuit further comprises a delay circuit having a resistor and a buffer connected in series circuit arrangement between the output of said second flip-flop circuit and an input of said exclusive OR gate and a capacitor connected between a common point in the connection of said resistor and said buffer and a point at ground potential.

3. Apparatus for measuring the propagation time of ultrasonic waves by counting the number of clock pulses occurring within the period of time from the transmission of an ultrasonic pulse to the receiving of said ultrasonic pulse, said apparatus comprising a receiving circuit for receiving a transmitted pulse and a received pulse and producing an output which continues from transmission until reception of said received pulse, said receiving circuit comprising a first flip-flop circuit having inputs receiving said transmitted pulse and said received pulse, respectively, and an output;

a gate circuit for providing an output and receiving the output of said receiving circuit, and for receiving clock pulses;

a forward counter for receiving the output of said gate circuit, said counter counting the number A of clock pulses in the output of said gate circuit;

a time-difference detection circuit for receiving the output of said receiving circuit and said clock pulses and for detecting pulses occurring during a time interval $t_1+t_0$ and a time interval $t_2+t_0$, where $t_1$ is a time interval starting at the leading edge of said transmitted pulse and ending at the leading edge of the first clock pulse thereafter, $t_2$ is a time interval starting at the leading edge of said received pulse and ending at the leading edge of the first clock pulse thereafter, and $t_0$ is an arbitrary predetermined delay time, said time-difference detection circuit providing an output, said time-difference detection circuit comprising an inverter having an output and an input receiving said clock pulses, a second flip-flop circuit having a first input receiving the output of said first flip-flop circuit, a second input receiving such clock pulses and an output, and a third flip-flop circuit having a first input receiving the output of said second flip-flop circuit, a second input receiving the output of said inverter and an output, and an exclusive OR gate having an output and input receiving the output of said third flip-flop circuit and the output of said first flip-flop circuit, respectively;

an integration circuit for receiving the output of said time-difference detection circuit, said integration circuit providing an output; an analog-digital converter for digitizing the output of said integration circuit at amplification ratios which are m times said time interval $t_1+t_0$ and said time interval $t_2+t_0$, said analog-digital converter providing an output; and a subtractor for receiving the output of said analog-digital converter and the output of said receiving circuit which continues from transmission to reception, and calculating the difference between a digital numeric value B corresponding to the time interval $m(t_1+t_0)$ detected from the output of said analog-digital converter and a digital numeric value C corresponding to the time interval $m(t_2+t_0)$, the duration of the time interval t between transmission and reception being determined in accordance with the equation $t=[A+1/m(B-C)]\times$ (time corresponding to one clock wavelength).

4. Apparatus for measuring the propagation time of ultrasonic waves by counting the number of clock pulses occurring within the period of time from the transmission of an ultrasonic pulse to the receiving of said ultrasonic pulse, said apparatus comprising a receiving circuit for receiving a transmitted pulse and a received pulse and producing an output which continues from tranmission until reception of said received pulse, said receiving circuit comprising a first flip-flop circuit having input receiving said transmitted pulse and said received pulse, respectively, and an output;

a gate circuit for providing an output and receiving the output of said receiving circuit, and for receiving clock pulses;

a forward counter for receiving the output of said gate circuit, said counter counting the number A of clock pulses in the output of said gate circuit;

a time-difference detection circuit for receiving the output of said receiving circuit and said clock pulses and for detecting pulses occurring during a time interval $t_1 t_0$ and a time interval $t_2+t_0$, where $t_1$ is a time interval starting at the leading edge of said transmitted pulse and ending at the leading edge of the first clock pulse thereafter, $t_2$ is a time interval starting at the leading edge of said received pulse and ending at the leading edge of the first clock pulse thereafter, and $t_0$ is an arbitrary predetermined delay time, said time-difference detection circuit providing an output, said time difference detection circuit comprising a second flip-flop circuit having a first input receiving the output of said first flip-flop circuit, a second input receiving said clock pulses and an output, a third flip-flop circuit having a first input receiving the output of said second flip-flop circuit, a second input receiving said clock pulses and an output, and an exclusive OR gate having an output and inputs receiving the output of said third flip-flop circuit and the output of said first flip-flop circuit, respectively;

an integration circuit for receiving the output of said time-difference detection circuit, said integration circuit providing an output;

an anlog-digital converter for digitizing the output of said integration circuit at amplification ratios which are m times said time interval $t_1+t_0$ and said time interval $t_2+t_0$, said analog-digital converter providing an output; and a subtractor for receiving the output of said analog-digital converter and the output of said receiving circuit which continues from transmission to reception, and calculating the difference between a digital numeric value B corresponding to the time interval $m(t_1+t_0)$ detected from the output of said analog-digital converter and a digital numeric value C corresponding to the time interval $m(t_2+t_0)$, the duration of the time interval t between transmission and reception being determined in accordance with the equation $$t=[A+1/m(B-C)]\times(\text{time corresponding to one clock wavelength}).$$

5. Apparatus as claimed in claim 4, wherein said time-difference detection circuit further comprises a fourth flip-flop circuit having a first input receiving the output of said third flip-flop circuit, a second input receiving said clock pulses and wherein the inputs of said exclusive OR gate receive the output of said fourth flip-flop circuit and the output of said first flip-flop circuit, respectively.

* * * * *